United States Patent
Agrawal

(10) Patent No.: US 10,133,595 B2
(45) Date of Patent: Nov. 20, 2018

(54) METHODS FOR PRODUCING TASK REMINDERS ON A DEVICE

(71) Applicant: Motorola Mobility LLC, Chicago, IL (US)

(72) Inventor: Amit Kumar Agrawal, Bangalore (IN)

(73) Assignee: MOTOROLA MOBILITY LLC, Chicago, IL (US)

(*) Notice: Subject to any disclaimer, the term of this patent is extended or adjusted under 35 U.S.C. 154(b) by 103 days.

(21) Appl. No.: 15/240,448

(22) Filed: Aug. 18, 2016

(65) Prior Publication Data
US 2018/0052706 A1    Feb. 22, 2018

(51) Int. Cl.
*G06F 9/46* (2006.01)
*G06F 9/48* (2006.01)

(52) U.S. Cl.
CPC .............. *G06F 9/461* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 2012/0042003 A1* | 2/2012 | Goetz | G06F 9/5066 709/203 |
| 2013/0159376 A1* | 6/2013 | Moore | H04L 67/10 709/202 |
| 2015/0150014 A1* | 5/2015 | Sar | G06F 9/46 718/102 |
| 2016/0142323 A1* | 5/2016 | Lehmann | H04L 47/215 709/226 |

* cited by examiner

*Primary Examiner* — Gregory A Kessler
(74) *Attorney, Agent, or Firm* — Kunzler, PC

(57) ABSTRACT

Apparatuses, methods, and program products are disclosed for producing a task reminder on a device. One method includes detecting, by use of a processor, a task to be completed via a user account in an environment that does not enable the task to be completed. The method also includes tagging the task as an incomplete task. The method includes directing information to be stored. The information associates the incomplete task with the user account, and the information is used to produce a reminder to complete the incomplete task.

18 Claims, 7 Drawing Sheets

METHODS FOR PRODUCING TASK REMINDERS ON A DEVICE

FIELD

The subject matter disclosed herein relates to task reminders and more particularly relates to producing task reminders on a device.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may operate in an environment that does not enable a task to be completed. Productivity may be adversely affected by tasks not being completed.

BRIEF SUMMARY

A method for producing a task reminder is disclosed. An apparatus and computer program product may also perform the functions of the method. In one embodiment, the method includes detecting, by use of a processor, a task to be completed via a user account in an environment that does not enable the task to be completed. The method, in various embodiments, includes tagging the task as an incomplete task. In a further embodiment, the method includes directing information to be stored. In such an embodiment, the information associates the incomplete task with the user account, and the information is used to produce a reminder to complete the incomplete task.

In some embodiments, the task is selected from the group of tasks that includes accessing a website, opening an encrypted file, accessing an application, and accessing a network location. In one embodiment, the environment includes a type of information handling device, an operating system, and a network availability.

In another embodiment, detecting the task to be completed includes detecting the task to be completed in response to attempting to complete the task. In some embodiments, detecting the task to be completed includes identifying the task as not being enabled to be completed in the environment before attempting to complete the task. In one embodiment, directing the information to be stored includes directing the information to be stored remotely. In certain embodiments, the method includes displaying a reason that the task is not enabled to be completed in the environment. In various embodiments, the method includes determining a compatible environment associated with the user account for completing the task, and displaying the compatible environment.

Another method for producing a task reminder, in one embodiment, includes receiving, by use of a processor, information associated with a user account that is logged in to an information handling device. In such an embodiment, the information associates an incomplete task with the user account. In some embodiments, the method includes displaying a reminder to complete the incomplete task. In such an embodiment, the incomplete task is a task tagged in an environment that did not enable the task to be completed.

In some embodiments, the task is selected from the group of tasks including accessing a website, opening an encrypted file, accessing an application, and accessing a network location. In various embodiments, the environment includes a type of information handling device, an operating system, and a network availability. In one embodiment, receiving the information includes receiving the information from a remote device.

In some embodiments, receiving the information includes receiving the information from local storage. In certain embodiments, the information associates multiple incomplete tasks with the user account. In such embodiments, displaying the reminder to complete the incomplete task includes displaying reminders to complete each incomplete task of the multiple incomplete tasks.

In one embodiment, a method for producing a task reminder includes receiving device information corresponding to multiple devices accessed via a user account. In a further embodiment, the method includes storing the device information corresponding to the multiple devices with user account information associated with the user account. In various embodiments, the method includes receiving incomplete task information corresponding to an incomplete task associated with the user account. In such embodiments, the incomplete task is a task tagged in an environment that did not enable the task to be completed. In certain embodiments, the method includes storing the incomplete task information with the user account information.

In one embodiment, the method includes detecting access to a device of the multiple devices via the user account. In some embodiments, the method includes determining whether the incomplete task is able to be completed on the device. In such embodiments, the method may include, in response to determining that the incomplete task is able to be completed on the device, providing the incomplete task information to the device. In certain embodiments, the incomplete task information includes information to resume completion of the incomplete task.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
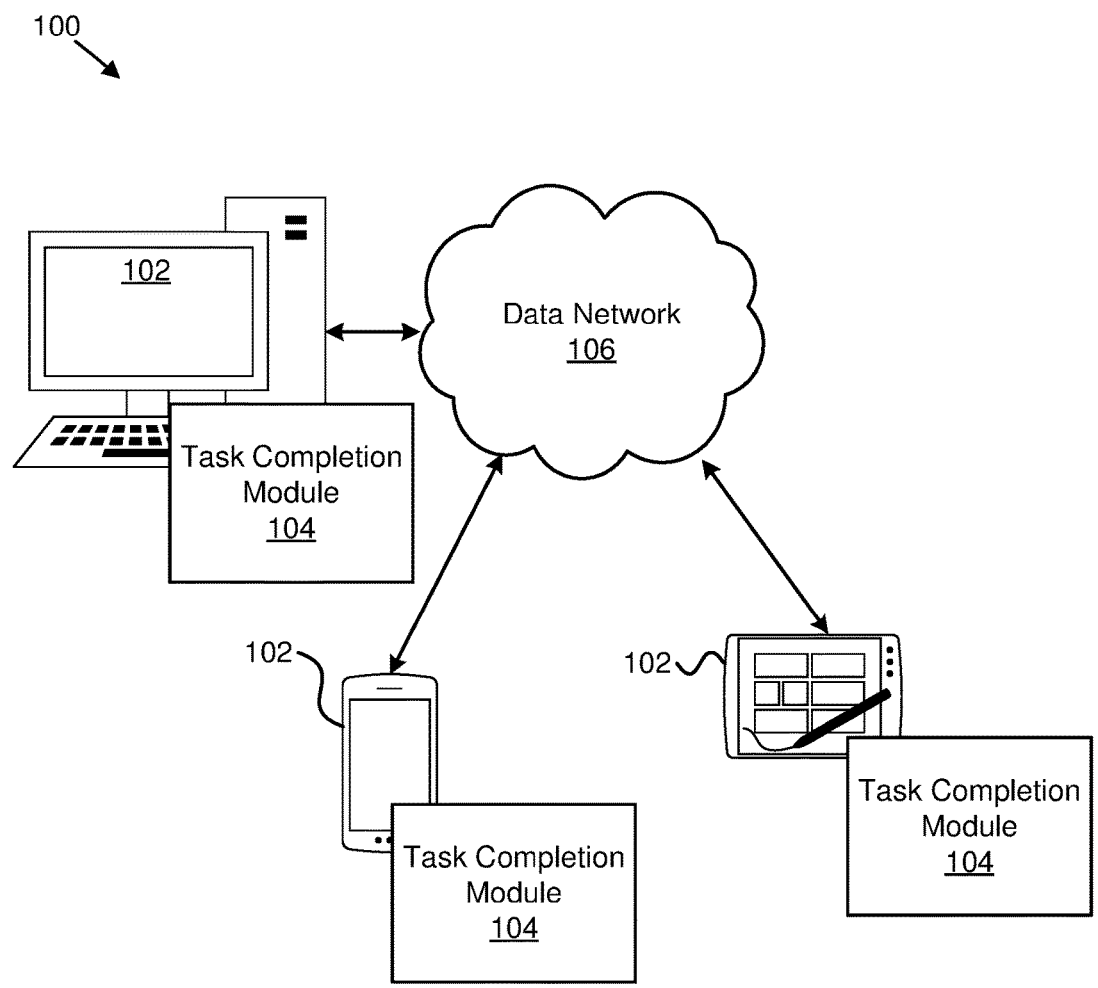
FIG. 1 is a schematic block diagram illustrating one embodiment of a system for producing a task reminder.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for producing a task reminder. In one embodiment, the system 100 includes information handling devices 102, task completion modules 104, and data networks 106. Even though a specific number of information handling devices 102, task completion modules 104, and data networks 106 are depicted in FIG. 1, one of skill in the art will recognize that any number of information handling devices 102, task completion modules 104, and data networks 106 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the information handling devices 102 include wearable devices, such as smart watches, fitness bands, optical head-mounted displays, or the like. The information handling devices 102 may access the data network 106 directly using a network connection. In various embodiments, the information handling devices 102 may communicate and/or share power directly with one another.

The information handling devices 102 may include an embodiment of the task completion module 104. In certain embodiments, the task completion module 104 may detect, by use of a processor, a task to be completed via a user account in an environment that does not enable the task to be completed. In some embodiments, the task completion module 104 may tag the task as an incomplete task. In a further embodiment, the task completion module 104 may direct information to be stored. In such an embodiment, the information associates the incomplete task with the user account, and the information is used to produce a reminder to complete the incomplete task. In this manner, the task completion module 104 may be used to produce a reminder for an incomplete task.

In various embodiments, the task completion module 104 may receive, by use of a processor, information associated with a user account that is logged in to an information handling device. In such an embodiment, the information associates an incomplete task with the user account. In some embodiments, the task completion module 104 may display a reminder to complete the incomplete task. In such an embodiment, the incomplete task is a task tagged in an environment that did not enable the task to be completed.

In certain embodiments, the task completion module 104 may receive device information corresponding to multiple devices accessed via a user account. In a further embodiment, the task completion module 104 may store the device information corresponding to the multiple devices with user account information associated with the user account. In various embodiments, the task completion module 104 may receive incomplete task information corresponding to an incomplete task associated with the user account. In such embodiments, the incomplete task is a task tagged in an environment that did not enable the task to be completed. In certain embodiments, the task completion module 104 may store the incomplete task information with the user account information.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
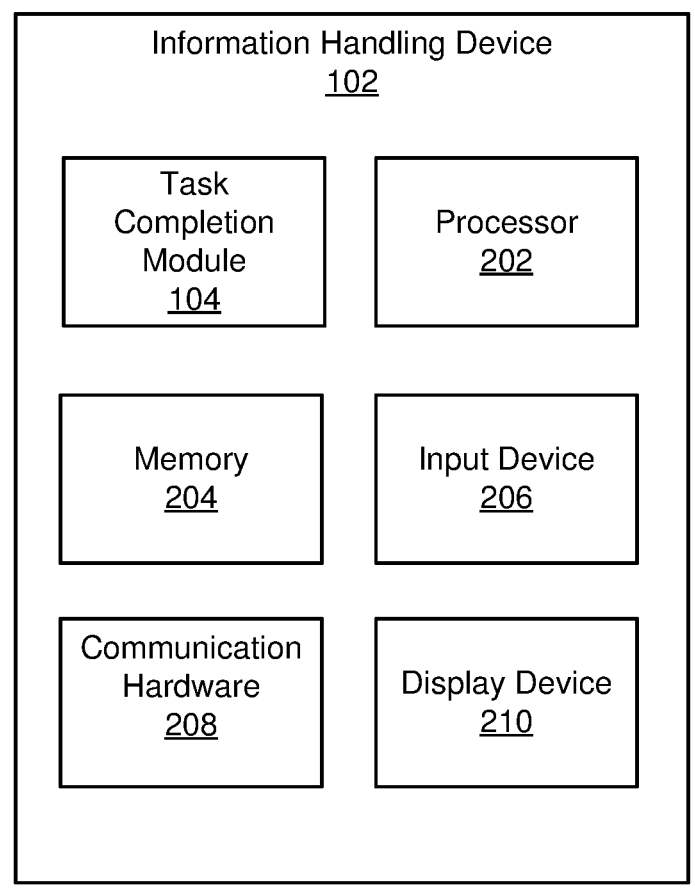
FIG. 2 is a schematic block diagram illustrating one embodiment of an apparatus including an information handling device.

FIG. 2 depicts one embodiment of an apparatus 200 that may be used for producing a task reminder. The apparatus 200 includes one embodiment of the information handling device 102. Furthermore, the information handling device 102 may include the task completion module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the task completion module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores information that associates an incomplete task with a user account, such information may be used to produce a reminder to complete an incomplete task. In some embodiments, the memory 204 also stores program code and related data, such as an operating system or other controller algorithms operating on the information handling device 102.

The information handling device 102 may use the task completion module 104 for detecting, storing, retrieving, and/or displaying a task to be completed via a user account. As may be appreciated, the task completion module 104 may include computer hardware, computer software, or a combination of both computer hardware and computer software. For example, the task completion module 104 may include circuitry, or a processor, used to detect, store, retrieve, and/or display a task to be completed via a user account. As another example, the task completion module 104 may include computer program code that is used to detect, store, retrieve, and/or display a task to be completed via a user account.

The input device 206, in one embodiment, may include any known computer input device including a touch panel, a button, a keyboard, a stylus, a microphone (e.g., for receiving voice inputs), a sensor (e.g., motion sensor, camera, etc. for receiving gesture inputs), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime) upon detecting a task that is not enabled to be completed. In some embodiments, the display device 210 includes one or more haptic devices for producing vibrations, motion, or other haptic feedback. For example, the display device 210 may produce haptic feedback upon detecting a task that is not enabled to be completed.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the task completion module 104.

Figure 3:
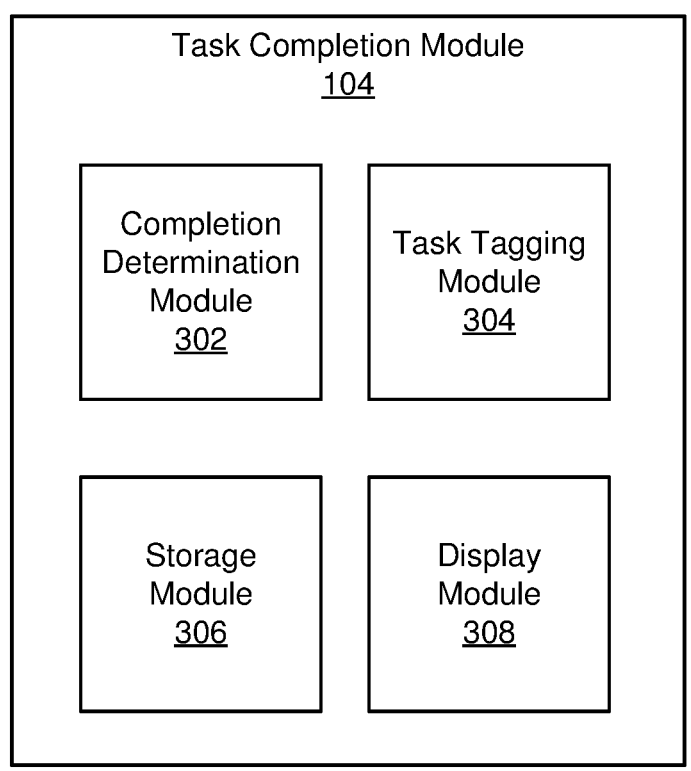
FIG. 3 is a schematic block diagram illustrating one embodiment of an apparatus including a task completion module.

FIG. 3 depicts a schematic block diagram illustrating one embodiment of an apparatus 300 that includes one embodiment of the task completion module 104. Furthermore, the task completion module 104 includes a completion determination module 302, a task tagging module 304, a storage module 306, and a display module 308.

In some embodiments, the completion determination module 302 may detect (e.g., by use of a processor) a task attempted to be completed via a user account in an environment that does not enable the task to be completed. The task may include any suitable task, such as accessing a website, opening an encrypted file, accessing an application, and/or accessing a network location, among other things. The environment may include a type of information handling device (e.g., smart phone, tablet, desktop computer, laptop computer, etc.), an operating system, and/or a network availability (e.g., virtual private network availability, home network availability, work network availability). In one example, a user logged into an information handling device 102 using a user account (e.g., authentication, computer login, social media login, account login, etc.) may attempt completion of a task, but the task is not able to be completed in the environment of the information handling device 102 at the time the attempt is made.

In one embodiment, the completion determination module 302 may detect the task to be completed in response to attempting to complete the task, but not completing the task. For example, a user may attempt to complete a task, but the task may not be able to be completed. In particular, a user may attempt to access a website, access an encrypted document, access an application, access a network location, and so forth. In certain embodiments, the completion determination module 302 may identify the task as not being enabled to be completed in the environment before attempting to complete the task. For example, the completion determination module 302 may identify that an application and/or document may not be opened on an information handling device 102, so the completion determination module 302 does not attempt to complete the task, and identifies the task as not being enabled to be completed. In one embodiment, the completion determination module 302 may identify the completion of a previously identified incomplete task.

In some embodiments, the completion determination module 302 may, in response to detecting that a task may not be completed in an environment, facilitate transferring the task to another device with an environment on which the task may be completed. For example, an identity associated with the user (e.g., user account) and/or information corresponding to the task may be transferred to a nearby device using near field communication, Bluetooth™, Wi-Fi, and so forth. In such an example, a graphical interface for completing the task may also be transferred to the nearby device.

In various embodiments, the task tagging module 304 may tag a task that has been identified as not being enabled to be completed as an incomplete task. In some embodiments, an incomplete task is a task that has been attempted, but is not able to be completed. In certain embodiments, an incomplete task is a task that is unable to be completed in a certain environment and does not depend on whether or not the task has been attempted to be completed.

In one embodiment, the storage module 306 may direct information to be stored and/or may store information. The information may associate an incomplete task with a user account, and the information may be used to produce a reminder to complete the incomplete task. In various embodiments, the storage module 306 may direct the information to be stored remotely. In some embodiments, the storage module 306 may direct the information to be stored locally. In one embodiment, the storage module 306 may store device information corresponding to multiple devices with user account information associated with a user account. For example, the storage module 306 may be used to create a database for a user that is organized using user account information. The database may include information about each type of device (e.g., information handling device 102) that the user logs into using their user account information. The information about each type of device may include environment information, such as the type of device (e.g., tablet, smart phone, laptop computer, desktop computer, etc.), type of operating system, and/or network information (e.g., public network, private network, etc.). In various embodiments, the storage module 306 may store incomplete task information with the user account information. For example, a database for a user that is organized using the user account information may store information about each identified incomplete task until the incomplete task is completed.

In certain embodiments, the display module 308 may display a reminder to complete an incomplete task. The incomplete task may be a task previously tagged by the task tagging module 304 in an environment that did not enable the task to be completed. The display module 308 may display the reminder to complete the incomplete task in response to a user logging into their user account (e.g., logging in to a computer), or in response to the user accessing a device on which the user is already logged in. In some embodiments, the display module 308 may display one or more incomplete tasks in response to detecting that the one or more incomplete tasks are able to be completed in the environment in which they will be displayed. For example, if the one or more incomplete tasks may only be completed on a desktop computer connected to a virtual private network, then the one or more incomplete tasks may only be displayed when it is detected that the user is logged in to the desktop computer and the virtual private network is established.

In certain embodiments, the display module 308 may display reminders to complete each incomplete task of multiple incomplete tasks. In various embodiments, the display module 308 may display a reason that the task is not enabled to be completed in the environment, such as displaying the reason together with the task. In some embodiments, the display module 308 may display an environment that is compatible for completing a task, such as displaying the environment with the task. In various embodiments, the display module 308 may stop displaying reminders to complete an incomplete task in response to detecting that the incomplete task has been completed and/or in response to a user marking the incomplete task as being completed.

Figure 4:
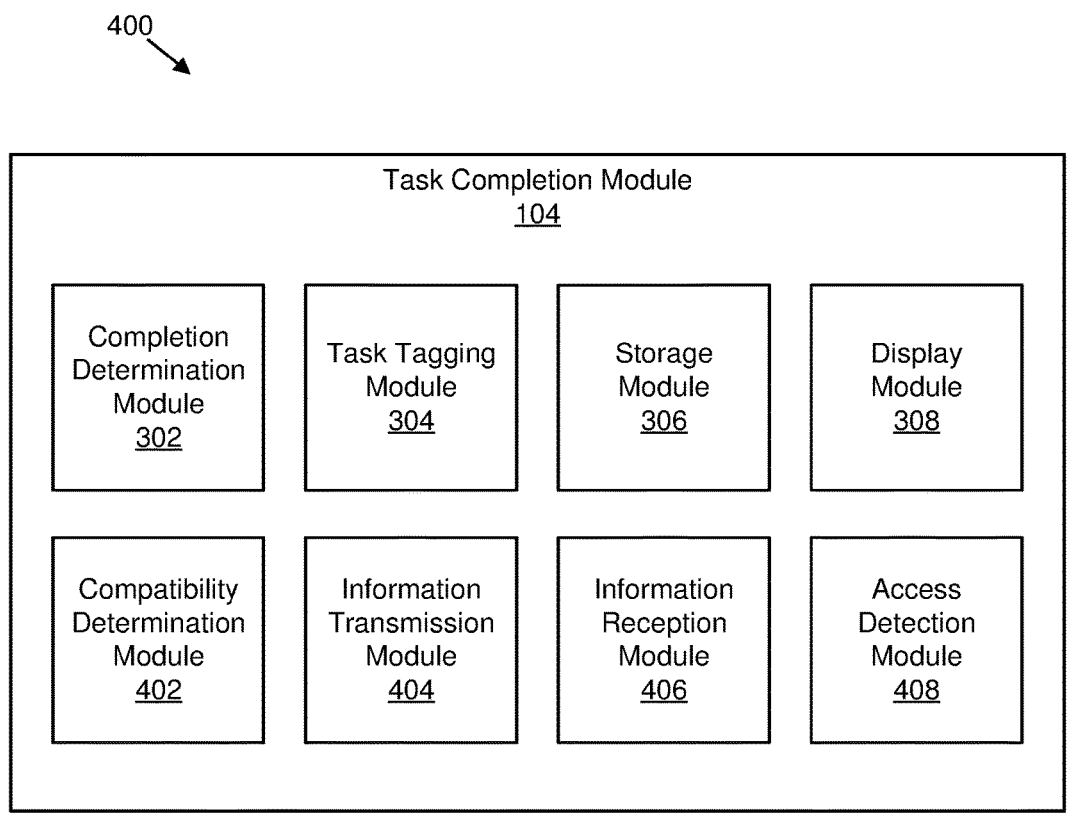
FIG. 4 is a schematic block diagram illustrating another embodiment of an apparatus including a task completion module.

FIG. 4 is a schematic block diagram illustrating another embodiment of an apparatus 400 that includes one embodiment of the task completion module 104. Furthermore, the task completion module 104 includes one embodiment of the completion determination module 302, the task tagging module 304, the storage module 306, and the display module 308, that may be substantially similar to the completion determination module 302, the task tagging module 304, the storage module 306, and the display module 308 described in relation to FIG. 3. The task completion module 104 also includes a compatibility determination module 402, an information transmission module 404, an information reception module 406, and an access detection module 408.

In certain embodiments, the compatibility determination module 402 may determine a compatible environment associated with a user account for completing a task. For example, the compatibility determination module 402 may check a database including all information handling devices 102 that the user account uses and may determine an environment that may be used for completing the task. In one embodiment, the compatibility determination module 402 may determine whether an incomplete task is able to be completed on a device. This may be performed by comparing the requirements of the incomplete task to the devices used by a user account. In certain embodiments, the compatibility determination module 402 may, upon detection of a task that is not able to be completed, direct a user to an environment in which the task is able to be completed.

In some embodiments, the information transmission module 404 may, in response to determining that an incomplete task is able to be completed on a device, provide the incomplete task information to the device. In one embodiment, the incomplete task information includes information to resume completion of an incomplete task. For example, an incomplete task may have been started, but was not completed because of the environment in which the task was started. Portions of the incomplete task may have been completed, so the task information may include enough information to enable the incomplete task to be continued from the point at which the incomplete task was stopped.

In various embodiments, the information transmission module 404 may transmit, by use of a processor, information associated with a user account that is logged in to an information handling device. The information may associate an incomplete task with the user account. In certain embodiments, the information associates multiple incomplete tasks with the user account. In one embodiment, the information transmission module 404 transmits device information corresponding to multiple devices accessed via a user account. In some embodiments, the information transmission module 404 may transmit the information to a remote device. In various embodiments, the information transmission module 404 may transmit the information after retrieving the information from local storage.

In some embodiments, the information transmission module 404 may transmit incomplete task information corresponding to an incomplete task associated with a user account. The incomplete task may be a task tagged in an environment that did not enable the task to be completed.

In various embodiments, the information reception module 406 may receive, by use of a processor, information associated with a user account that is logged in to an information handling device. The information may associate an incomplete task with the user account. In certain embodiments, the information associates multiple incomplete tasks with the user account. In one embodiment, the information reception module 406 receives device information corresponding to multiple devices accessed via a user account. In some embodiments, the information reception module 406 may receive the information from a remote device. In various embodiments, the information reception module 406 may receive the information from local storage.

In some embodiments, the information reception module 406 may receive incomplete task information corresponding to an incomplete task associated with a user account. The incomplete task may be a task tagged in an environment that did not enable the task to be completed.

In certain embodiments, the access detection module 408 may detect access to a device out of multiple devices accessible via the user account. In response to detecting access to a device (e.g., logging in, authenticating, using, etc.), the access detection module 408 may direct incomplete tasks associated with the user account to be displayed on the device. In some embodiments, only incomplete tasks that are able to be completed in the environment of the device may be displayed on the device.

Figure 5:
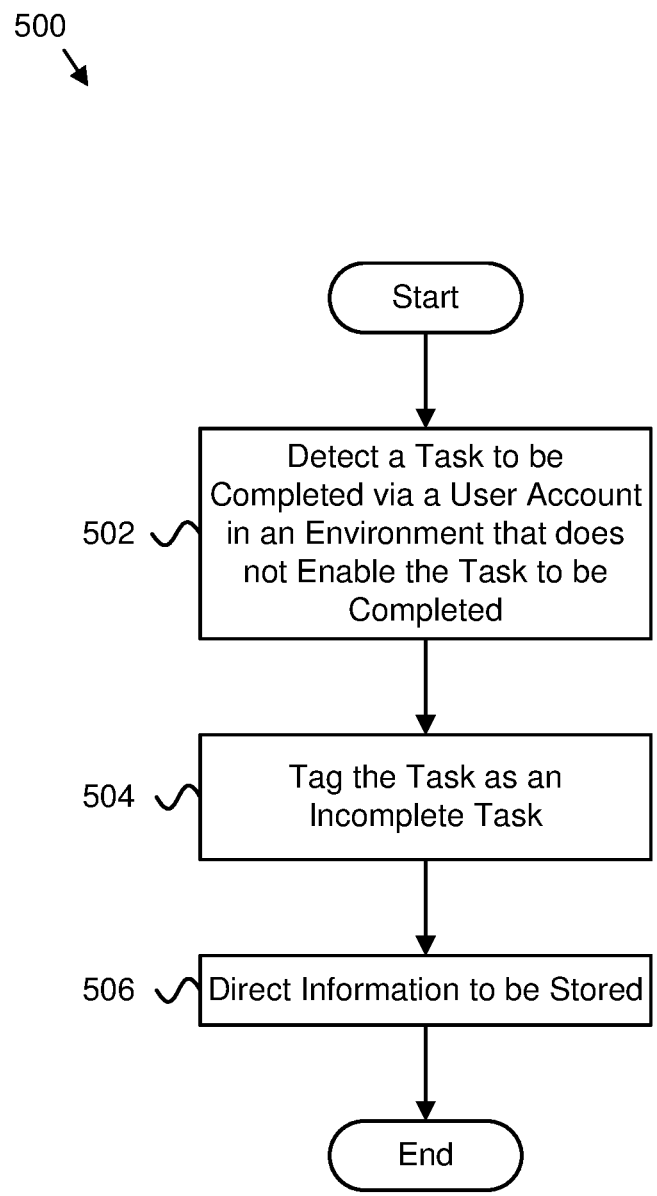
FIG. 5 is a schematic flow chart diagram illustrating an embodiment of a method for detecting a task to be completed.

FIG. 5 is a schematic flow chart diagram illustrating an embodiment of a method 500 for detecting a task to be completed. In some embodiments, the method 500 is performed by an apparatus, such as the information handling device 102. In other embodiments, the method 500 may be performed by a module, such as the task completion module 104. In certain embodiments, the method 500 may be performed by a processor executing program code, for example, a microcontroller, a microprocessor, a CPU, a GPU, an auxiliary processing unit, a FPGA, or the like.

The method 500 includes detecting 502 (e.g., by use of a processor) a task to be completed via a user account in an environment that does not enable the task to be completed. In certain embodiments, the completion determination module 302 detects 502 the task to be completed via the user account in the environment that does not enable the task to be completed. In some embodiments, the task is selected from the group of tasks that includes accessing a website, opening an encrypted file, accessing an application, and accessing a network location. In one embodiment, the environment includes a type of information handling device, an operating system, and/or a network availability. In one embodiment, detecting 502 the task to be completed includes detecting the task to be completed in response to attempting to complete the task. In some embodiments, detecting 502 the task to be completed includes identifying the task as not being enabled to be completed in the environment before attempting to complete the task.

The method 500 also includes tagging 504 the task as an incomplete task. In certain embodiments, the task tagging module 304 may tag 504 the task as an incomplete task. Furthermore, the method 500 includes directing 506 information to be stored. The information may associate the incomplete task with the user account, and the information may be used to produce a reminder to complete the incomplete task. In some embodiments, the storage module 306 directs 506 the information to be stored. In one embodiment, directing 506 the information to be stored includes directing the information to be stored remotely.

In certain embodiments, the method 500 includes displaying a reason that the task is not enabled to be completed in the environment. In various embodiments, the method 500 includes determining a compatible environment associated with the user account for completing the task, and displaying the compatible environment.

Figure 6:
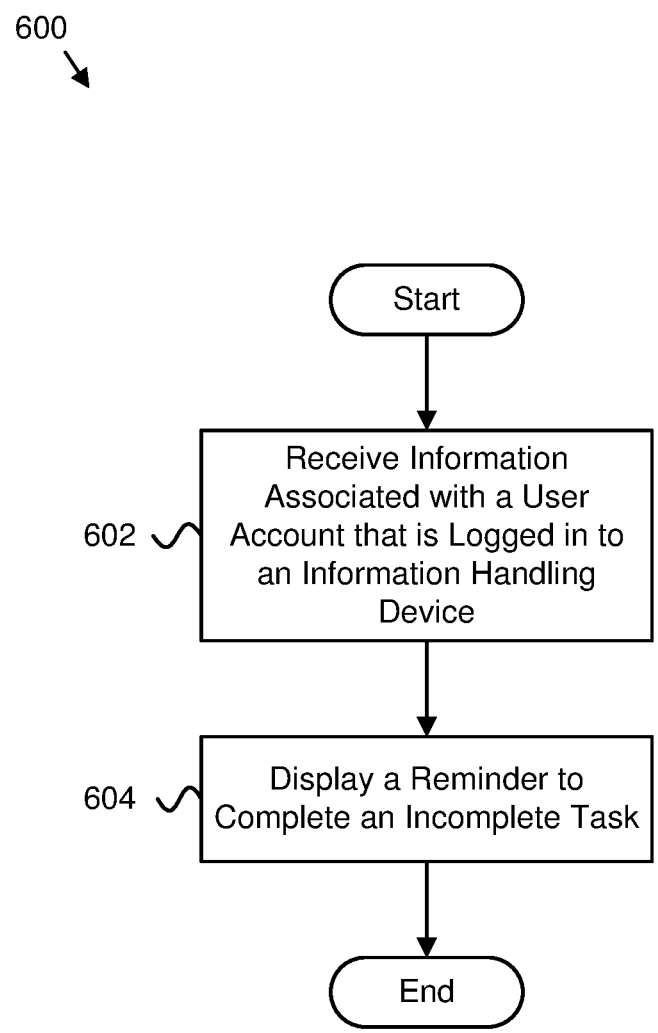
FIG. 6 is a schematic flow chart diagram illustrating an embodiment of a method for displaying a task to be completed.

FIG. 6 is a schematic flow chart diagram illustrating an embodiment of a method 600 for displaying a task to be completed. In some embodiments, the method 600 is performed by an apparatus, such as the information handling device 102. In other embodiments, the method 600 may be performed by a module, such as the task completion module 104. In certain embodiments, the method 600 may be performed by a processor executing program code, for example, a microcontroller, a microprocessor, a CPU, a GPU, an auxiliary processing unit, a FPGA, or the like.

The method 600 includes receiving 602 (e.g., by use of a processor) information associated with a user account that is logged in to an information handling device 102. The information associates an incomplete task with the user account. In some embodiments, the information reception module 406 receives 602 the information associated with the user account that is logged in to the information handling device 102. In some embodiments, the task is selected from the group of tasks including accessing a website, opening an encrypted file, accessing an application, and accessing a network location. In various embodiments, the environment includes a type of information handling device, an operating system, and/or a network availability. In one embodiment, receiving 602 the information includes receiving the information from a remote device. In some embodiments, receiving 602 the information includes receiving the information from local storage. In certain embodiments, the information associates multiple incomplete tasks with the user account.

The method 600 also includes displaying 604 a reminder to complete the incomplete task. The incomplete task is a task tagged in an environment that did not enable the task to be completed. In certain embodiments, the display module 308 displays 604 the reminder to complete the incomplete task. In certain embodiments, displaying 604 the reminder to complete the incomplete task includes displaying reminders to complete each incomplete task of multiple incomplete tasks.

Figure 7:
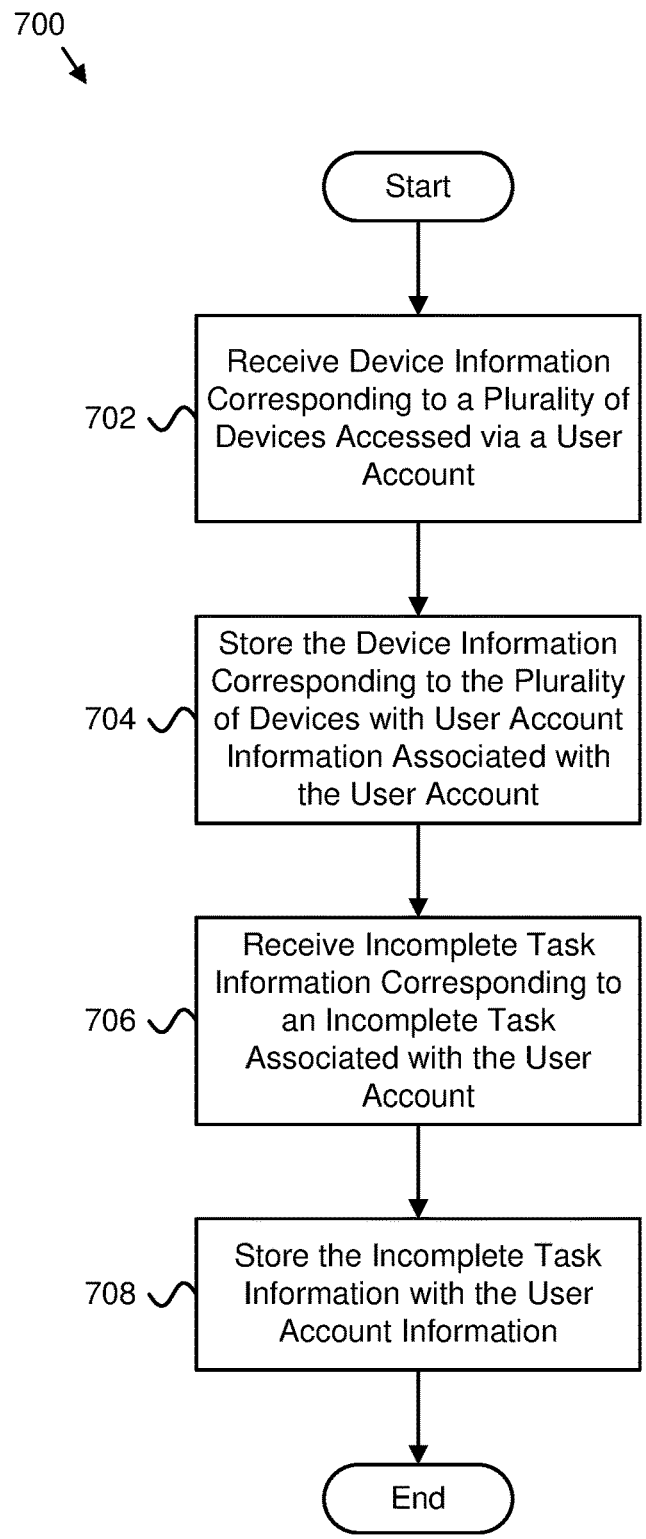
FIG. 7 is a schematic flow chart diagram illustrating an embodiment of a method for storing information about a task to be completed.

FIG. 7 is a schematic flow chart diagram illustrating an embodiment of a method 700 for storing information about a task to be completed. In some embodiments, the method 700 is performed by an apparatus, such as the information handling device 102. In other embodiments, the method 700 may be performed by a module, such as the task completion module 104. In certain embodiments, the method 700 may be performed by a processor executing program code, for example, a microcontroller, a microprocessor, a CPU, a GPU, an auxiliary processing unit, a FPGA, or the like.

The method 700 includes receiving 702 device information corresponding to multiple devices accessed via a user account. In some embodiments, the information reception module 406 receives 702 device information corresponding to multiple devices accessed via the user account. The method 700 also includes storing 704 the device associated with the user account. In certain embodiments, the storage module 306 stores 704 the device information corresponding to the multiple devices with the user account information associated with the user account. The method 700 includes receiving 706 incomplete task information corresponding to an incomplete task associated with the user account. The incomplete task may be a task tagged in an environment that did not enable the task to be completed. In various embodiments, the information reception module 406 receives 706 the incomplete task information corresponding to the incomplete task associated with the user account. The method 700 also includes storing 708 the incomplete task information with the user account information. In some embodiments, the storage module 306 stores 708 the incomplete task information with the user account information.

In one embodiment, the method 700 includes detecting access to a device of the multiple devices via the user account. In some embodiments, the method 700 includes determining whether the incomplete task is able to be completed on the device. In such embodiments, the method 700 may include, in response to determining that the incomplete task is able to be completed on the device, providing the incomplete task information to the device. In certain embodiments, the incomplete task information includes information to resume completion of the incomplete task.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting, by use of a processor, a task to be completed via a user account in an environment that does not enable the task to be completed, wherein the environment does not enable the task to be completed as a result of a type of information handling device, an operating system, a network availability, or some combination thereof;
   tagging the task as an incomplete task; and
   directing information to be stored, wherein the information associates the incomplete task with the user account, and the information is used to produce a reminder to complete the incomplete task in an environment compatible with the incomplete task.

2. The method of claim 1, wherein the task is selected from the group of tasks consisting of accessing a website, opening an encrypted file, accessing an application, and accessing a network location.

3. The method of claim 1, wherein detecting the task to be completed comprises detecting the task to be completed in response to attempting to complete the task.

4. The method of claim 1, wherein detecting the task to be completed comprises identifying the task as not being enabled to be completed in the environment before attempting to complete the task.

5. The method of claim 1, wherein directing the information to be stored comprises directing the information to be stored remotely.

6. The method of claim 1, further comprising displaying a reason that the task is not enabled to be completed in the environment.

7. The method of claim 1, further comprising determining the compatible environment associated with the user account for completing the task, and displaying the compatible environment.

8. A method comprising:
   receiving, by use of a processor, information associated with a user account that is logged in to an information handling device in an environment compatible with an incomplete task, wherein the information associates the incomplete task with the user account; and
   displaying a reminder to complete the incomplete task based on the information, wherein the incomplete task is a task detected to be completed via the user account in an environment that does not enable the task to be completed and tagged as the incomplete task, wherein the environment does not enable the task to be completed as a result of a type of information handling device, an operating system, a network availability, or some combination thereof.

9. The method of claim 8, wherein the task is selected from the group of tasks consisting of accessing a website, opening an encrypted file, accessing an application, and accessing a network location.

10. The method of claim 8, wherein receiving the information comprises receiving the information from a remote device.

11. The method of claim 8, wherein receiving the information comprises receiving the information from local storage.

12. The method of claim 8, wherein the information associates a plurality of incomplete tasks with the user account.

13. The method of claim 12, wherein displaying the reminder to complete the incomplete task comprises displaying reminders to complete each incomplete task of the plurality of incomplete tasks.

14. A method comprising:
   receiving device information corresponding to a plurality of devices accessed via a user account;
   storing the device information corresponding to the plurality of devices with user account information associated with the user account;
   receiving incomplete task information corresponding to an incomplete task associated with the user account, wherein the incomplete task is a task detected to be completed via the user account in an environment that does not enable the task to be completed and tagged as the incomplete task, wherein the environment does not enable the task to be completed as a result of a type of information handling device, an operating system, a network availability, or some combination thereof; and
   storing the incomplete task information with the user account information, wherein the incomplete task information is used to provide a reminder to the user to complete the incomplete task based on the device information.

15. The method of claim 14, further comprising detecting access to a device of the plurality of devices via the user account.

16. The method of claim 15, further comprising determining whether the incomplete task is able to be completed on the device as a result of an environment of the device being compatible with the incomplete task.

17. The method of claim 16, further comprising, in response to determining that the incomplete task is able to be completed on the device, providing the incomplete task information to the device.

18. The method of claim 17, wherein the incomplete task information comprises information to resume completion of the incomplete task.

* * * * *